(12) United States Patent
Hendrickson

(10) Patent No.: US 9,199,677 B2
(45) Date of Patent: Dec. 1, 2015

(54) MOBILE TIRE CHANGING TOOL ASSEMBLY

(71) Applicant: John Hendrickson, Avon, MN (US)

(72) Inventor: John Hendrickson, Avon, MN (US)

( * ) Notice: Subject to any disclaimer, the term of this patent is extended or adjusted under 35 U.S.C. 154(b) by 0 days.

(21) Appl. No.: 14/288,651

(22) Filed: May 28, 2014

(65) Prior Publication Data

US 2014/0353344 A1  Dec. 4, 2014

Related U.S. Application Data

(60) Provisional application No. 61/828,050, filed on May 28, 2013.

(51) Int. Cl.
*B62D 43/02* (2006.01)
*B60R 9/06* (2006.01)

(52) U.S. Cl.
CPC .. *B62D 43/02* (2013.01); *B60R 9/06* (2013.01)

(58) Field of Classification Search
CPC ............ B60R 9/06; B60R 9/10; B62D 43/02
USPC ................. 224/518–521, 529, 525, 530, 531
See application file for complete search history.

(56) References Cited

U.S. PATENT DOCUMENTS

| 4,756,354 | A | | 7/1988 | Callas |
| 4,896,712 | A | | 1/1990 | du Quesne |
| 5,232,035 | A | * | 8/1993 | Adams, Jr. .................... 157/1.17 |
| 5,370,285 | A | | 12/1994 | Steelman |
| 5,469,998 | A | | 11/1995 | Van Dusen et al. |
| 6,874,804 | B2 | * | 4/2005 | Reese et al. .................... 280/477 |
| 7,284,586 | B2 | * | 10/2007 | Howland .......................... 157/14 |
| 7,533,789 | B1 | * | 5/2009 | Seely et al. ................. 224/42.12 |
| 8,245,755 | B2 | | 8/2012 | Tornga |
| 8,251,265 | B2 | | 8/2012 | Grudek |
| 8,840,000 | B1 | * | 9/2014 | Simpson ....................... 224/509 |
| 2013/0221042 | A1 | * | 8/2013 | Fortner ..................... 224/42.21 |

* cited by examiner

*Primary Examiner* — Brian D Nash
*Assistant Examiner* — Corey Skurdal
(74) *Attorney, Agent, or Firm* — Daniel Boudwin; Global Intellectual Property Agency LLC

(57) ABSTRACT

A mobile tire changing tool assembly is provided. The assembly comprises a center post from which to support a wheel and tire, a tire demount bar, and a bead breaker tool attached to the center post. At the base of the center post is an elongated member adapted to be supported by one or more tool support assemblies or attached directly to a trailer hitch receiver. The supports include a T-shaped fitting that supports the elongated post in a vertical state from a trailer hitch, as well as an elongated, L-shaped support supporting the elongated member in a vertical state away from the rear of a vehicle. The tool support assemblies allow a user to mount and demount tires from wheel rims while traveling or in a remote location, wherein a vehicle hitch receiver is used as a support for the tool.

6 Claims, 6 Drawing Sheets

MOBILE TIRE CHANGING TOOL ASSEMBLY

CROSS REFERENCE TO RELATED APPLICATION

This application claims the benefit of U.S. Provisional Application No. 61/828,050 filed on May 28, 2013. The above identified patent application is herein incorporated by reference in its entirety to provide continuity of disclosure.

BACKGROUND OF THE INVENTION

1. Field of the Invention

The present invention relates to tire changing assemblies and support structures therefor. More specifically, the present invention relates to a new mobile tire changing assembly that includes structure such that the tire changer is supported from the tailgate of a vehicle and supported in a static position while changing a tire away from a shop or residence in which the tire change would otherwise be secured to the floor.

Tire changing assemblies are tools utilized to remove and replace a tire from a wheel rim. These assemblies come in various levels of sophistication and cost, ranging from the simple hand actuated models for a do-it-yourselfers to the elaborate, automated assemblies for replacing tires on a commercial scale. The more elaborate and expensive tire changers generally accommodate larger wheel sizes and have measures to prevent damage to the wheel during tire removal and installation. However, for the average do-it-yourselfer and home mechanics several simple tire changing mechanism are available in the art that allow for changing one's own tires.

Tire changers generally support a single wheel and tire in a horizontal position, whereby the tool includes a bead breaker tool and a tire mount/demount bar. The wheel and tire are secured to an upstanding post or adjacent to the tool as the bead breaker tool presses on the tire at the interface between the tire and wheel after the tire has been deflated. This "breaks" the bead, or separates the rim and tire along the bead of the tire and allows the tire and wheel to be separated. After removal, a replacement tire is pressed onto the rim and the tire and the mount/demount bar is used to work the bead of the replacement tire over the rim of the wheel. Lubrication of the bead is generally required as the bar is used to fold the tire bead over the rim, wherein the tool is worked along the perimeter of the wheel until the tire is completely positioned between the opposing rims of the wheel. The tire can then be inflated and balanced prior to installation on the vehicle.

Tire changing tools of this type are known in the art and provide a handy tool for home mechanics, wherein personal vehicle tires and recreational/race vehicle tires can be changed without professional assistance. However, in order to properly operate the tool and replace the tire, the center post of the tool has to be statically mounted to the ground or to another support. Otherwise the tool supporting the wheel will rotate as the user is attempting to mount or dismount the tire, which will be counter to his objectives and work against his actions. Because of this, most users fasten the tool to the ground or secure the tire changer assembly to a fixed support.

A need therefore arises for the traveling mechanic and for the user who needs to change tires in the field, either during competition, track days, or when away from civilization (e.g. traveling or in military situations). The tire changer assembly of the present invention contemplates an assembly that is much like that of the art, however one that is mountable to a vehicle. The changer of the present invention is mountable to the tailgate receiver of a vehicle such that the center post of the tool does not move when changing a tire on a wheel, allowing swift and efficient changing of a tire away from a shop where the tool would otherwise be secured to the ground.

Specifically, the present invention is a tire changing assembly comprising a center post for supporting a wheel therefrom, a wheel perch and demount bar, and a bead breaker tool. The base of the center post comprises an elongated trailer hitch receiver post that is adapted to directly connect to a trailer hitch receiver or be supported by an L-shaped support assembly connected to the trailer hitch receiver. The L-shaped support assembly is an adjustable assembly comprising an upper vertical member and a lower horizontal member connected at a junction at their apex. The lower member supports the base of the center post away from the vehicle, while the upper member slidably fastens to the trailer hitch receiver via a receiver insert. Overall, the changer assembly allows a user to mount and dismount tires from wheels while traveling or in a remote location, wherein the vehicle trailer hitch receiver is used as a support for the assembly.

2. Description of the Prior Art

Devices have been disclosed in the prior art that relate to tire changing assemblies. These include devices that have been patented and published in patent application publications, and generally relate to larger, static tire changing tools and tire supports that are supported by the hitch of a vehicle. The following is a list of devices deemed most relevant to the present disclosure, which are herein described for the purposes of highlighting and differentiating the unique aspects of the present invention, and further highlighting the drawbacks existing in the prior art.

One such device of the prior art is U.S. Pat. No. 4,756,354 to Callas, which discloses a bead breaker tool that is mountable to an all-terrain vehicle and provides a user with a means to separate the bead of a tire from the wheel rim in remote locations. The device comprises an elongated base that is positioned on a flat surface of the vehicle, an upwardly extending post, and a slidable bead breaker support arm having a bead breaker implement pivotable therefrom. The Callas device provides a portable assembly suitable for collapsing the beads of heavy traction tires while in the field, wherein simple hand tools would be otherwise cumbersome or difficult to use with tires of this type. The Callas device allows a user to break the bead of the tire, but fails to contemplate a means of dismounting and re-mounting a tire thereon. The present invention contemplates a complete tire removal and installation assembly that is attachable to the tailgate receiver of a vehicle.

Another such device is U.S. Pat. No. 8,245,755 to Tornga, which discloses an assembly for mounting and demounting motorcycle tires from wheel rims, whereby the assembly comprises an "X" shaped base mountable onto a support surface, a spindle, and a mount/demount bar attachable to the spindle. The bar includes mounting and demounting tangs, whereby the bar is attached to the spindle after a wheel and tire have also been placed onto the spindle. The user can then rotate the bar to remove or mount the tire on the wheel. the tools may be wall mounted so that the spindle is horizontal, whereafter the tool also serves a dual purpose of allowing the user to balance the wheel on the spindle. While providing a unique, wall-mounted assembly for mounting and demounting a motorcycle tire, the Tornga device fails to disclose a means for secure the assembly to a trailer hitch receiver or utilizing the device along the rear of a parked vehicle. The Tornga device is mounted to a vertical wall or a flat surface to prevent the assembly from rotating while in use. By contrast, the present invention utilizes a trailer hitch sleeve that engages a trailer hitch receiver to statically support the device while in use.

U.S. Pat. No. 5,469,998 to Van Dusen discloses a vehicle hitch mounted tire carrier for supporting a spare tire along the rear of a vehicle. The device comprises a cantilever construction having an elongated arm with a tire mounting structure and a bracket for pivotably securing the arm to a trailer hitch sleeve. The arm is normally in an upright condition while the sleeve engages the trailer hitch receiver of a vehicle. A lever-controlled cinch is provided for articulating the arm downward and thereby rotating the spare tire from the vehicle and to the ground to dismount the same or to allow clearance for the vehicle rear lift gate. The Van Dusen device provides a structure that supports a wheel and tire from a tailgate; however it fails to contemplate a means to removing and mounting a tire to a wheel rim using a structure supported by a vehicle. The Van Dusen device is a novel spare tire mount for a hitch-equipped vehicle.

Similar to the Van Dusen device is U.S. Pat. No. 8,251,265 to Grudek. Grudek discloses a spare tire carrier that supports a spare tire at an angle such that the vehicle approach angle at the end of the vehicle is not compromised by an otherwise horizontal spare tire support. The carrier comprises a hitch anchor mounted to the tow hitch receiver of the vehicle and an L-shaped carrier that is angularly supported with respect to the hitch anchor. A lower shoulder bar supports the carrier and a support spare tire at an angle relative to the hitch anchor, providing clearance along the outer portions of the vehicle so as not to interfere with shrubbery or earth during steep vehicle descents or ascents. Similar to the Van Dusen device, the Grudek devices fails to contemplate a tire changing apparatus. The Grudek device provides a novel spare tire attachment that incorporates the trailer hitch receiver, but does not provide a user with a tool to remove or replace a tire from a vehicle wheel.

Finally, U.S. Pat. No. 5,370,285 to Steelman discloses a swing-away rack for a spare tire that includes a support member supporting the spare tire that is hingedly connected to a vehicle hitch mount assembly. The device enables the spare tire support to be pivoted away from the rear of the vehicle to make clearance for the swing path of the vehicle tailgate door. The Steelman device secures to a tailgate and is associated with wheels and tires; however the Steelman device fails to provide a means of mounting and demounting a tire from a vehicle wheel using an assembly supported by the vehicle tailgate. The present invention contemplates several support structures for a tire changing tool, whereby the support structures attach to the vehicle tailgate.

It is submitted that the present invention is substantially divergent in design elements from the prior art, and consequently it is clear that there is a need in the art for an improvement to existing tire changing devices. In this regard the instant invention substantially fulfills these needs.

SUMMARY OF THE INVENTION

In view of the foregoing disadvantages inherent in the known types of tire changing tools now present in the prior art, the present invention provides a new vehicle-mounted tire changing assembly that can be utilized for providing convenience for the user when mounting or demounting a tire from a vehicle wheel while traveling and from the rear of a motor vehicle.

It is therefore an object of the present invention to provide a new and improved tire changing assembly that has all of the advantages of the prior art and none of the disadvantages.

It is another object of the present invention to provide a tire changing assembly that can be used while traveling or otherwise away from home, wherein tire changing is facilitated using a tool supported by the tailgate receiver of a motor vehicle.

Another object of the present invention is to provide a tire changing assembly that includes a basic tire changing tool and a support assembly that supports the tool from a vehicle tailgate receiver, preventing the tool from moving and not requiring the tool to be permanently secured to the ground.

Yet another object of the present invention is to provide a tire changing assembly that includes a tool support assembly having several embodiments, whereby the tire changing tool can be positioned and orientated as desired depending on the support assembly deployed.

Another object of the present invention is to provide a tire changing assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
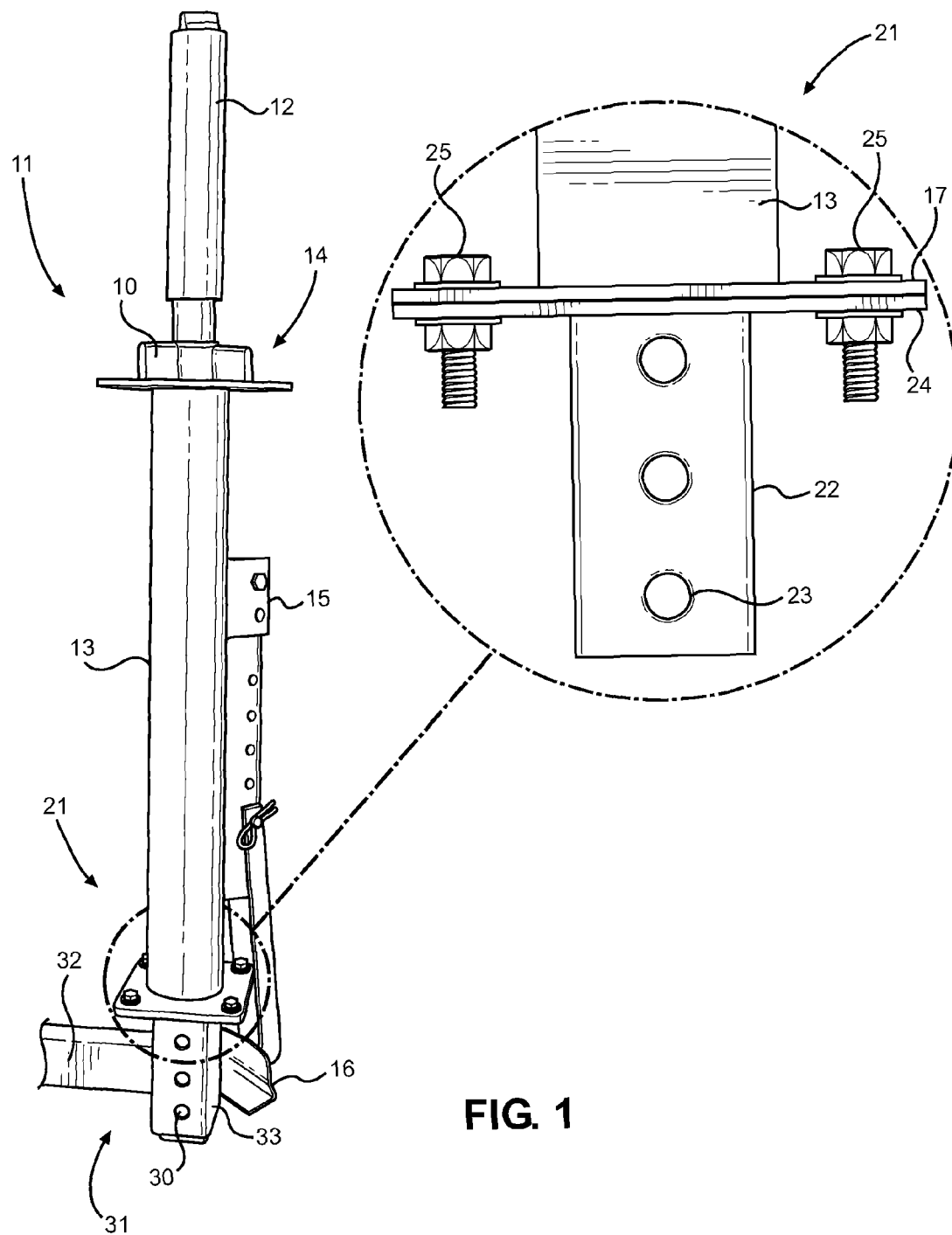
FIG. 1 shows a view of the tire changing tool of the present invention and its lower end member.

Reference is made herein to the attached drawings. Like reference numerals are used throughout the drawings to depict like or similar elements of the tire changing tool of the present invention. For the purposes of presenting a brief and clear description of the present invention, the preferred embodiment will be discussed as used for mounting or demounting a tire from a vehicle tire from the rear of a vehicle and while using the vehicle tailgate receiver as support for the tool. The figures are intended for representative purposes only and should not be considered to be limiting in any respect.

Referring now to FIG. 1, there is shown a view of the tire changing tool 11 of the present invention and a close-up view of the lower end 21 thereof. The tire changing tool 11 comprises an elongated body portion 13, a wheel perch 14, a center post 12 and a lower end 21 adapted to be supported by a support assembly attached to a vehicle tailgate receiver. Along the length of the body portion 13 is a hingedly attached bead breaker tool 16, which secures to the body portion 13 via a hinge joint 15 such that the bead breaker tool 16 can be pressed against a tire bead prior to the tire being placed onto the wheel perch 14. The wheel perch 14 includes a ledge surface that supports the hub of the vehicle wheel, while a threaded cap 10 is positioned over the post and threadably tightened against a wheel supported on the wheel perch 14. The center post 12 is sized to be positionable through a vehicle wheel center, whereby a wheel is positioned over the perch and the center post is accepted through the wheel center.

Once the wheel and tire has been secured to the tool, a demount bar (not shown) is used to work the bead over the wheel, wherein the demount bar is rotated around the center post 12 to obtain leverage. This process is well known in the art of tire changing assemblies. The present invention adds to the art by securing the tire changing tool 11 to a vehicle, and thus preventing the tool 11 from moving while in operation and eliminating the need to secure the tool 11 to the ground prior to use.

Turning to the lower end 21 of the tool, the base 17 of the tire changing tool is secured to an elongated member 22 extending downward therefrom. The elongated member 22 is adapted to be supported by a tailgate hitch receiver or the tire changing support assemblies disclosed below. The elongated member 22 comprises an elongated length and a plurality of fastener holes 23 therethrough. The holes 23 are used to secure a fastener through the member 22 and through its support. The member 22 is attached to a flange 24 that is fastened to the base 17 of the tire changing tool. The base flange 17 comprises a similar flange that extends radially outward from the body portion 13 of the tire changing tool and provides fastener locations within which to secure the base 17 to the lower end flange 17 via a plurality of fasteners. Alternatively, this joint may comprise a welded or molded connection, wherein the body portion 13 of the tool transitions to the lower member 22.

Figure 2:
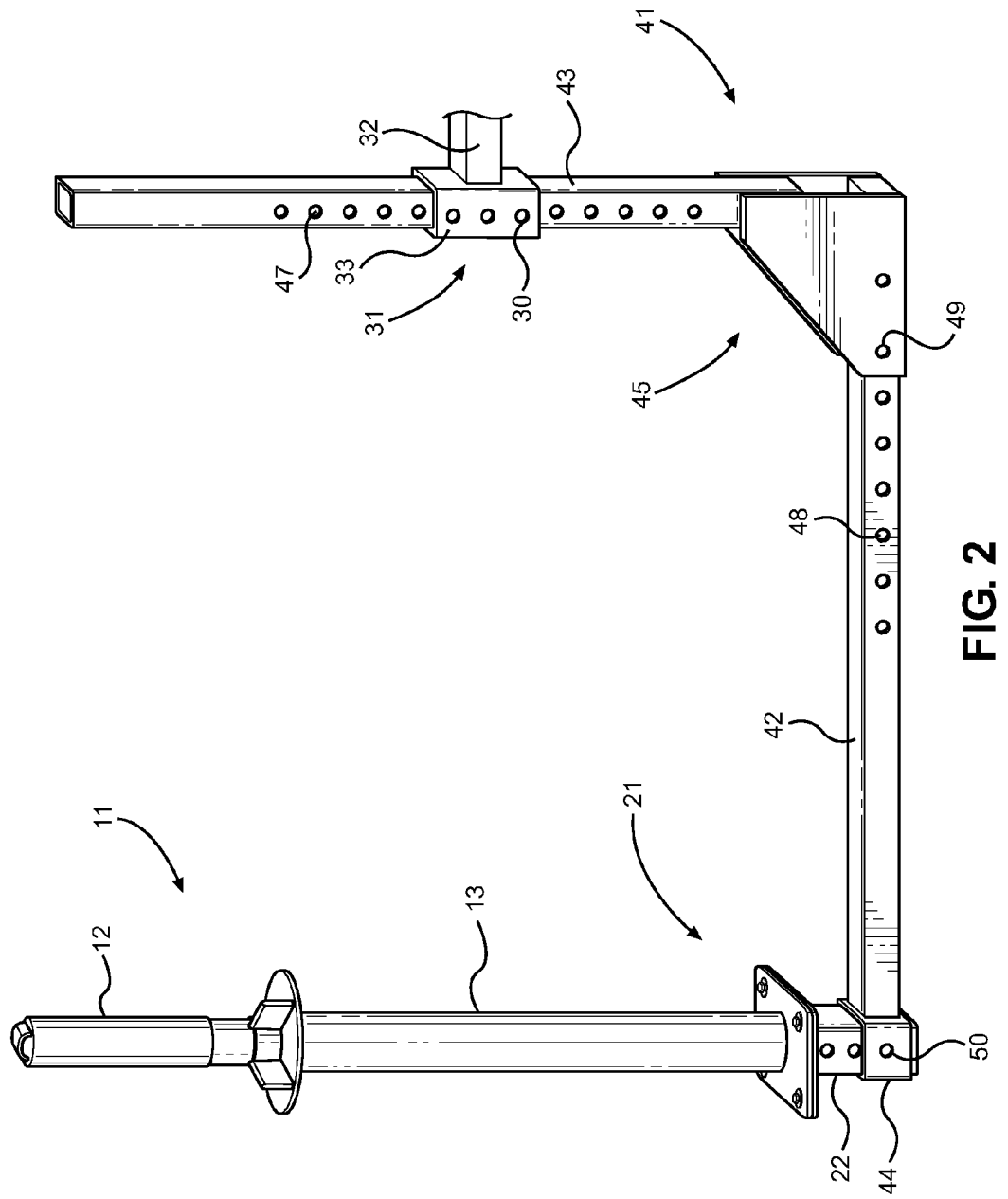
FIG. 2 shows a view of the tire changing tool and the elongated, L-shaped support assembly.
Figure 3:
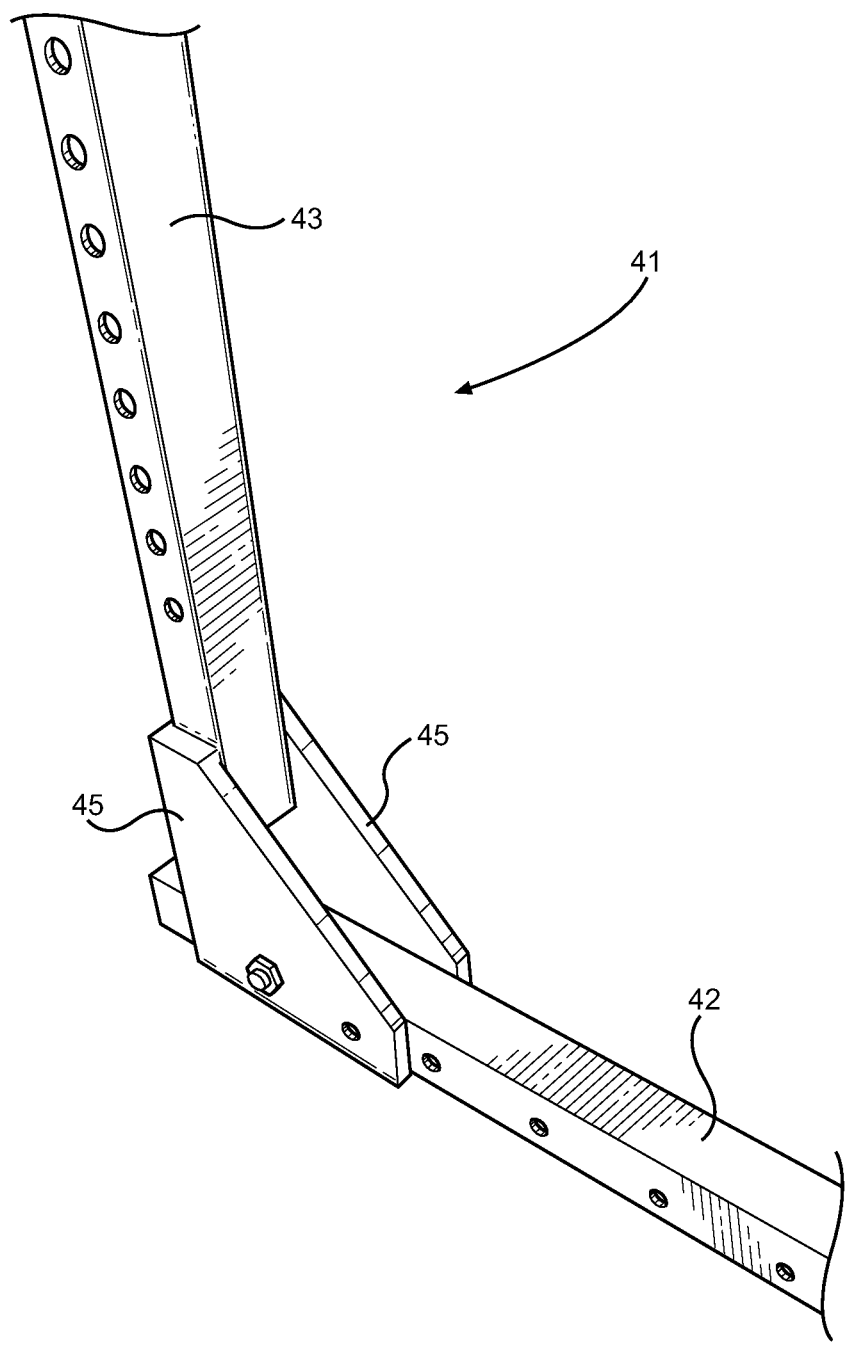
FIG. 3 shows another view of the L-shaped support assembly of the present invention.

Referring now to FIGS. 2 and 3, there is shown the first contemplated tool support assembly of the present invention. This embodiment comprises an L-shaped assembly 41 that supports the tire changing tool 11 in an upright state away from the tailgate of the vehicle. The L-shaped support assembly comprises adjustable an upper vertical member 43 and a lower horizontal member 42 connected at a junction 45 at their apex. The lower member 42 and vertical member 43 are disposed in a substantial perpendicular relationship, wherein the lower member 42 is adapted to rest against a ground surface while the vertical member 43 is adapted to be supported by the vehicle tailgate. A T-shaped fitting 31 is used to secure the vertical member 43 to the tailgate, wherein the vertical member 43 and fitting 31 are in a lockably sliding relationship with one another. The vertical member 43 secures to the T-shaped fitting 31, where preferably the lower member 42 is against the ground. The distal end 44 of the lower member supports the tool lower member 22 of the tire changing tool 11 such that the tool is in a vertical state.

Disposed on the L-shaped support assembly 41 are a plurality of fastener hole adjustments, whereby the exact position of the tool 11 can be controlled by the user given his or her preferences and the local environment. The distal end 44 of the lower member 42 includes at least one set of aligned fastener locations 50 therethrough, whereby a fastener or pin secures therethrough and through one pair of fastener holes in the tool lower member 22. Furthermore, the proximal end of the lower member includes a plurality of aligned lower member adjustment holes 48. These holes 48 are pairs of aligned holes that allow fasteners to be fed therethrough, whereby the junction 45 includes one or more sets of fastener holes to secure the lower member using a fastener or pin therethrough.

In this way, the distance between the distal end 44 of the lower member 42 and the junction 45 can be controlled, thereby offsetting the tire changing tool 11 from the attached vehicle a desired distance. Finally, a plurality of upper member adjustment holes 47 are provided for controlling the height of the lower member 42, whereby pairs of holes 47 align with one or more pairs of fastening holes 30 in the T-shaped fitting 31.

Securing the L-shaped support assembly 41 is a T-shaped fitting 31 that secures the upper member 43 thereof to a vehicle tailgate hitch receiver. The T-shaped fitting 31 comprises a hollow member 33 adapted to receive the vertical member 43 therethrough, wherefrom an elongated hitch post 32 extends perpendicularly therefrom. The hitch post 32 secures to a trailer hitch receiver directly, while the hollow member 33 supports the L-shaped support assembly 41 therefrom. The upper member 43 of the assembly 41 is secured to the upper portion of the junction 45, while the lower member 42 thereof is slidable within the junction 45 and fastenable thereto. Together with the distal end adjustment of the tool 11, the relative positioning of the tool 11 can be controlled by the user, whereby larger tires and wheels can be accommodated with larger offsets, or greater room can be afforded the user.

Figure 4:
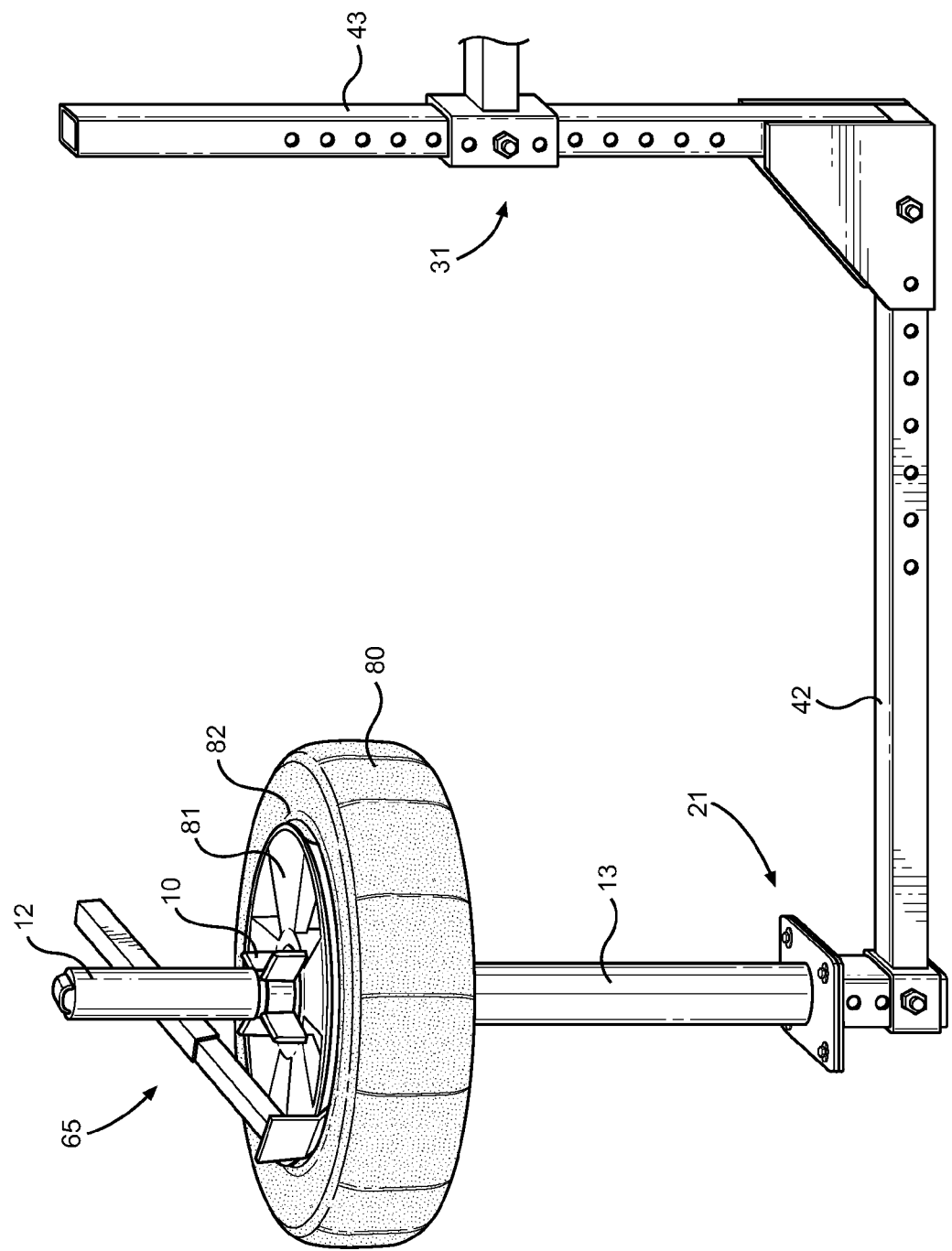
FIG. 4 shows a view of the tire changing tool of the present invention and the L-shaped support assembly in a working state.

Referring now to FIG. 4, there is shown a view of the present invention and the L-shaped support assembly in a working state, whereby a tire 80 is being mounted to a wheel rim 81. As shown, the tire changer tool supports a wheel and tire in a horizontal state when supported by the L-shaped support assembly. First, the bead 82 of the tire is broken using the bead breaker tool. This step is accomplished prior to the wheel 81 and tire 80 being secured to the center post 12 of the tire changing tool. Once the bead 82 is broken and the wheel 81 is secured to the center post 12 via the threaded cap 10, the user can operate a demount bar 65 around the center post 12 to lift the bead 82 over the outer rim of the wheel 81, whereafter complete removal is possible. The reverse operation is conducted using the demount bar 65 when mounting the tire 80 to the wheel 81, whereby the demount bar 65 lifts the bead 82 over the outer rim of the wheel 81 when mounting the same.

Normally the tire changing tool will be secured to the ground or to a similar support to prevent the tool from rotating when the demount bar 65 is being worked around the wheel 81. However, when away from home or in remote locations, securing the base of the tool is not possible. The present invention provides a stable structure that is supported by a vehicle tailgate, whereby the user can mount and demount tires from the rear of the vehicle and without securing the tool to the ground. This provides mobile mechanics, track day enthusiasts, and other users with a tool that attaches to their vehicle and facilities tire and wheel separation.

In the configuration as shown in FIG. 4, the lower end 21 of the tire changing tool is stabilized by the lower member 42 of the L-shaped support assembly. The upper end 43 thereof is secured by the T-shaped fitting 31, which in turn is secured into the tailgate receiver of the vehicle. The position of the tool is controlled using adjustment pins or fasteners, whereby the tool can be extended farther from the vehicle and at a desired elevation from the tailgate.

Figure 5:
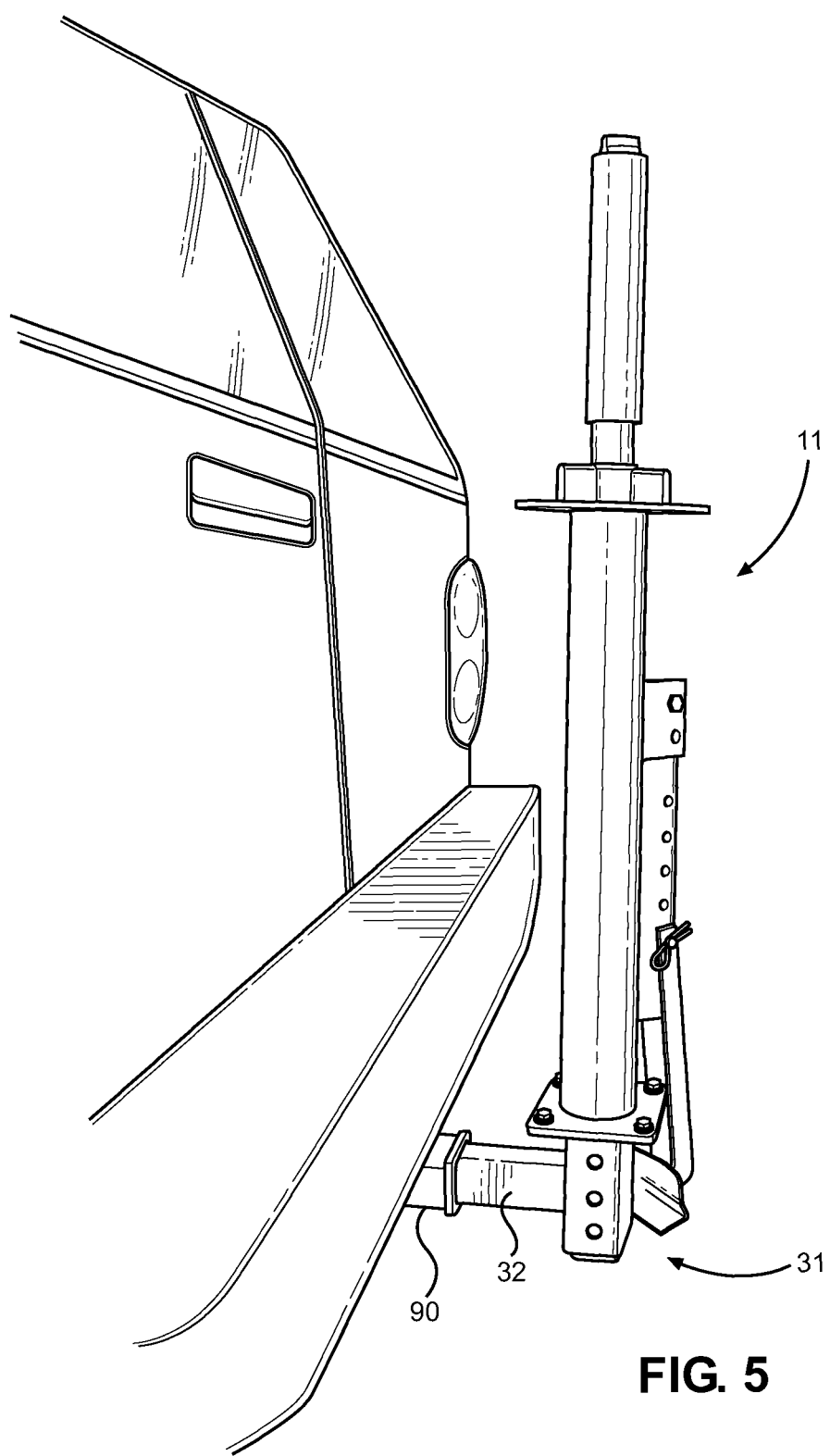
FIG. 5 shows a view of the tire changing tool in an upright condition, supported by the T-shaped support assembly.

Referring now to FIG. 5, there is shown a view of the tire changer tool 11 attached directly to the T-shaped fitting 31 along its lower end. In this configuration, the lower end of the tool slides within the hollow member of the fitting 31 and is secured by way of a fastener. The hitch post 32 of the fitting 31 extends largely perpendicularly therefrom and is received by the vehicle trailer hitch receiver 90. This positions the changer tool 11 in an upright condition just behind the rear bumper of the vehicle. This configuration requires less area to change a tool than the L-shaped support assembly, and provides a tool for smaller tires or for those vehicles with an openable lift gate that can provide clearance for the swing path of the demount bar during operation.

Figure 6:
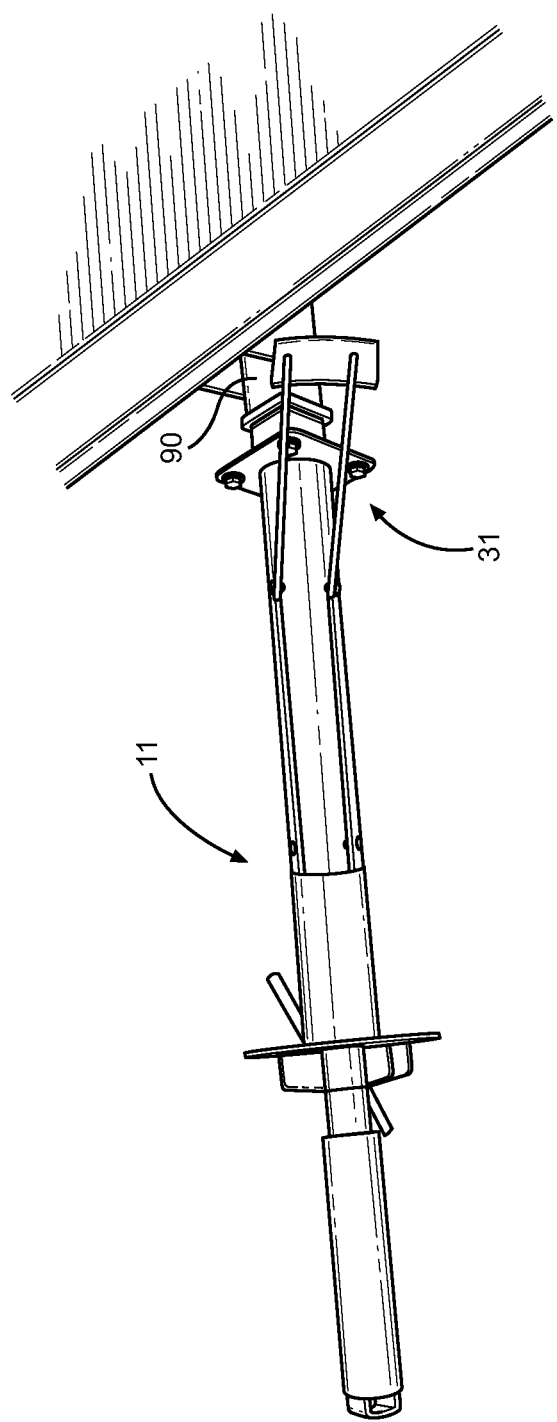
FIG. 6 shows a view of the tire changing tool directly connected to a vehicle tailgate receiver via its lower end member.

Referring finally to FIG. 6, there is shown a final configuration of the present invention. In this configuration, the tire changer tool 11 is positioned directly into the tailgate hitch receiver 90 of the vehicle. The base 21 of the tool is positioned against the tailgate receiver 90 and the elongated member thereof is secured within the receiver 90. This configuration places the tool 11 in a horizontal condition, whereby the user can change a tire when the wheel and tire are vertically orientated on the center post of the tool 11, as opposed to when horizontally oriented.

When people blow out a tire while driving and do not have a spare, they often have to wait on the side of the road until help arrives. They may have to call a tow truck and have their vehicle towed to a garage or a mechanic shop to dismount the old tire and mount a new tire onto the wheel. This situation is not only time consuming and inconvenient, but also expensive. Furthermore, for those specialist who frequently replace tires or for those track day enthusiasts who require fresh tires to participate, a tire changing tool is required that can be easily deployed in a remote location.

The present invention describes a mobile tire changer assembly that is supported by the tailgate of a vehicle. The device comprises a conventional tire changing apparatus that provides a means for mounting and demounting the a tire from a vehicle wheel, including passenger vehicles and motorcycles. Extending from the tool is an elongated member that is adapted to engage a T-shaped fitted, an L-shaped support assembly, or the vehicle tailgate receiver directly. In any configuration, the assembly is supported by the tailgate receiver and can be used without otherwise securing the changer tool to the ground. In most configurations the assembly can be adjusted based on preference and provides stable support for changing tires in remote areas. The device also provides a safe and secure way to change a tire without assistance from others.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mobile tire changing tool for attaching to the tailgate hitch receiver of a vehicle, comprising:
    a tire changing tool comprising an elongated body having an upper end and a lower end;
    a wheel perch disposed along said elongated body between said upper end and said lower end;
    said upper end further comprising a center post sized to be positionable through a vehicle wheel center;
    said lower end further comprising a base flange extending radially outward therefrom;
    said lower end further comprising an elongated member extending downward therefrom, said elongated member further comprising one or more pairs of fastening holes;
    a threaded cap threadably engageable to said tire changing tool over said wheel perch;
    an L-shaped tool support assembly comprising an upper vertical member and a lower horizontal member;
    said upper vertical member and said lower horizontal member forming a substantial L-shape and being connected by a junction at their apex;
    said lower horizontal member having a distal end adapted to receive said elongated member therethrough and at a substantially perpendicular orientation with respect thereto;
    said distal end comprising one or more pairs of fastening holes therethrough;
    said upper vertical member having one or more pairs of fastening holes therealong a T-shaped fitting comprising a hollow member adapted to receive said upper vertical member therethrough, and a hitch post disposed substantially perpendicular thereto;
    said hitch post adapted to be received by a vehicle trailer hitch receiver;
    said hollow member having one or more pairs of fastening holes therealong.

2. The mobile tire changing tool of claim 1, further comprising:
    said lower horizontal member having a proximal end being slidably positionable in relation to said junction;
    said proximal end having one or more pairs of fastening holes therealong;
    said junction having one or more pairs of fastening holes therethrough.

3. The mobile tire changing tool of claim 1, further comprising:
    a bead breaker tool hingedly attached to said elongated body.

4. The mobile tire changing tool of claim 1, further comprising a demount bar.

5. The mobile tire changing tool of claim 1, wherein:
    said elongated member further comprises a flange, said flange being fastened to said base flange.

6. The mobile tire changing tool of claim 1, further comprising:
    a T-shaped fitting comprising a hollow member adapted to receive said elongated member therethrough, and a hitch post disposed substantially perpendicular thereto;
    said hitch post adapted to be received by a vehicle trailer hitch receiver;
    said hollow member having one or more pairs of fastening holes therealong.

\* \* \* \* \*